(12) United States Patent
Bruno et al.

(10) Patent No.: US 10,885,464 B1
(45) Date of Patent: Jan. 5, 2021

(54) RELEVANCE DECAY FOR TIME-BASED EVALUATION OF MACHINE LEARNING APPLICATIONS

(71) Applicant: EMC IP Holding Company LLC, Hopkinton, MA (US)

(72) Inventors: Diego Salomone Bruno, Niterói (BR); Victor Bursztyn, Rio de Janeiro (BR); Percy E. Rivera Salas, Rio de Janeiro (BR); Tiago Salviano Calmon, Rio de Janeiro (BR)

(73) Assignee: EMC IP Holding Company LLC, Hopkington, MA (US)

( * ) Notice: Subject to any disclaimer, the term of this patent is extended or adjusted under 35 U.S.C. 154(b) by 916 days.

(21) Appl. No.: 15/338,624

(22) Filed: Oct. 31, 2016

(51) Int. Cl.
*G06K 9/68* (2006.01)
*A61B 5/04* (2006.01)
*G10L 25/63* (2013.01)
*G06K 9/62* (2006.01)
*G06N 20/00* (2019.01)

(52) U.S. Cl.
CPC .................................. *G06N 20/00* (2019.01)

(58) Field of Classification Search
CPC ....... G06N 20/00; G06F 17/30; G06F 15/173; G06F 17/00
USPC ..................................................... 706/1–62
See application file for complete search history.

(56) References Cited

U.S. PATENT DOCUMENTS

| 5,903,884 A * | 5/1999 | Lyon .................... G06K 9/6255 382/155 |
| 2003/0172373 A1* | 9/2003 | Henrickson ............... G06F 8/63 717/175 |
| 2005/0096866 A1* | 5/2005 | Shan ................... G06F 11/0751 702/179 |

(Continued)

OTHER PUBLICATIONS

Zheng et al., "Evaluating Machine Learning Models", 2015, O'Reilly, available at http//www.oreilly.om/data/free/files/evaluating-machine-learning-models.pdf.

(Continued)

*Primary Examiner* — Brandon S Cole
(74) *Attorney, Agent, or Firm* — Ryan, Mason & Lewis, LLP

(57) ABSTRACT

Relevance decay techniques are provided for time-based evaluation of machine learning applications and other classifiers. An exemplary method comprises obtaining time series measurement data; generating an input dataset comprising a plurality of records, wherein each record comprises features extracted from the time series measurement data, a target class corresponding to an event to be identified, and a time lag indicating a difference in time between a given extraction and the event to be identified; evaluating a plurality of classifiers during an evaluation phase using a portion of the input dataset and one or more predefined evaluation metrics weighted using a time-based relevance decay function based on the time lag; and selecting one or more of the classifiers to perform classification of the time series measurement data based on the predefined weighted evaluation metrics during a classification phase. The time (Continued)

lags indicate, for example, a time difference between classification moments of the plurality of classifiers and a respective instance of the event to be identified.

20 Claims, 8 Drawing Sheets

(56) References Cited

U.S. PATENT DOCUMENTS

| | | | | |
|---|---|---|---|---|
| 2007/0291958 | A1* | 12/2007 | Jehan | G10H 1/0025 381/103 |
| 2008/0188763 | A1* | 8/2008 | John | A61B 5/0452 600/516 |
| 2008/0270515 | A1* | 10/2008 | Chen | G06F 9/4856 709/202 |
| 2016/0321935 | A1* | 11/2016 | Mohler | G09B 5/08 |
| 2017/0249534 | A1* | 8/2017 | Townsend | G06K 9/6261 |

OTHER PUBLICATIONS

Santos et al., "Big Data Analytics for Predictive Maintenance Modeling: Challenges and Opportunities", paper OTC 26275 presented at the Offshore Technology Conference. Rio de Janeiro, Brazil (2015).

Breitman, Leo, "Random forests", Machine Learning 45.1 (2001): 5-32.

Quinlan, J. Ross, "Induction of decision trees", Machine learning 1.1 (1986): 81-106.

Seiffert et al., "RUSBoost: A hybrid approach to alleviating class imbalance", IEEE Transactions on Systems, Man, and Cybernetics-Part A: Systems and Humans 40.1 (2010): 185-197.

"Classification: True vs. False and Positive vs. Negative" downloaded from https://developers.google.com/machinel-learning/crash-course/classification/true-false-positive-negative on Jan. 31, 2020.

* cited by examiner

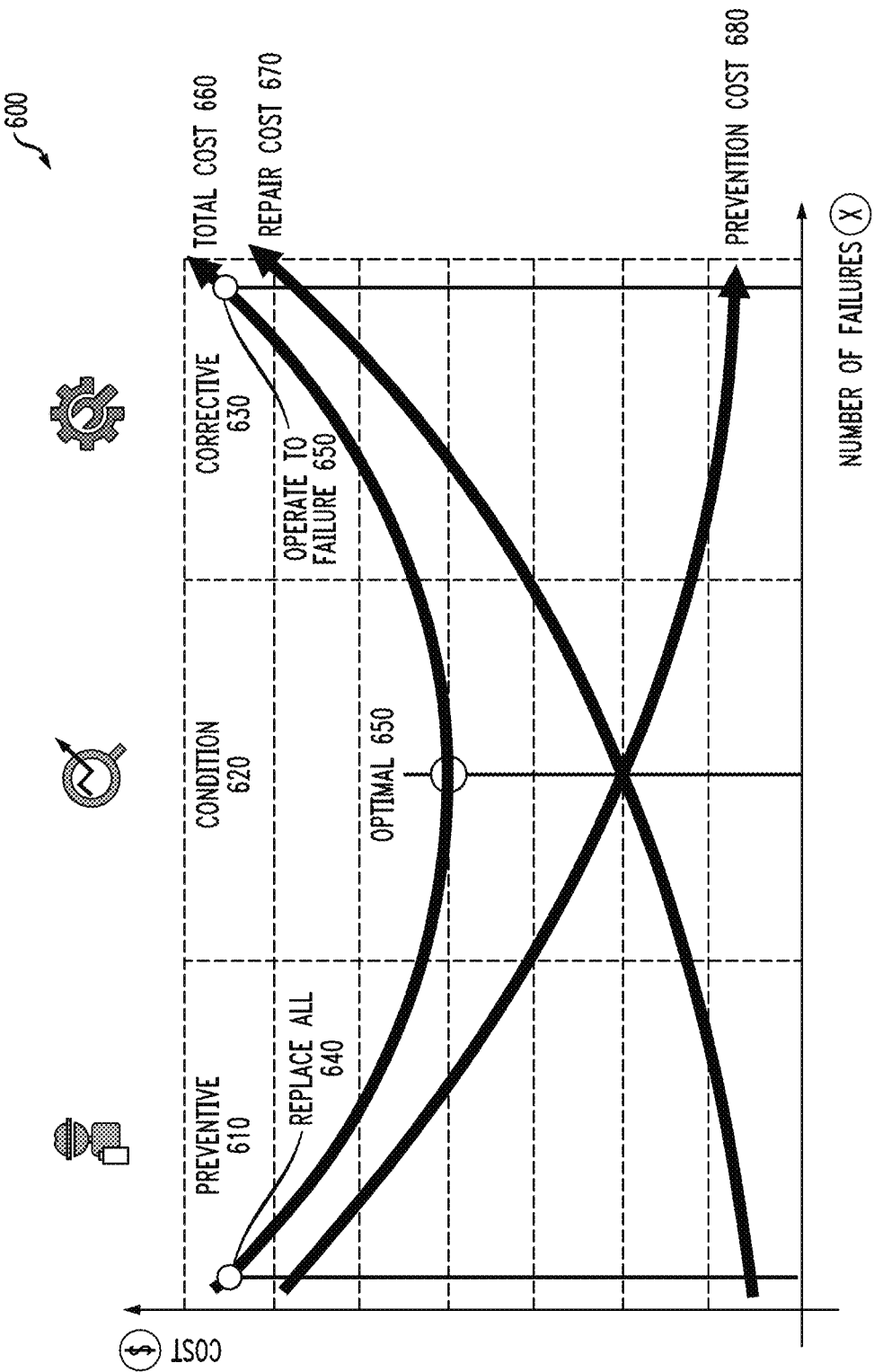

RELEVANCE DECAY FOR TIME-BASED EVALUATION OF MACHINE LEARNING APPLICATIONS

FIELD

The field relates generally to the processing and management of measurement data, such as sensor data.

BACKGROUND

For a wide range of applications, from Internet of Things (IoT) to Predictive Maintenance, the sooner that a problem (or another predefined event) is identified, the safer and cheaper that the problem can be resolved. In traditional Machine Learning (ML) applications, however, the training-validation-test workflow is typically executed offline, without taking into account this "the sooner the better" aspect of event identification. When dealing with data streams in real-time (i.e., typical production environments), models that are trained using this traditional offline approach tend to show an efficiency loss when deployed in real-time or live environments. One of the significant causes is the time-sensitive relevance that information receives in real-time applications.

A need exists for improved techniques for determining an efficiency of classifiers when dealing with real-time or streamed data, subject to relevance decay over time. A further need exists for improved techniques for comparing multiple classification results using such time-based information.

SUMMARY

Illustrative embodiments of the present invention provide relevance decay techniques for time-based evaluation of machine learning applications and other classifiers. In one exemplary embodiment, a method comprises the steps of obtaining time series measurement data; generating an input dataset comprising a plurality of records, wherein each record comprises one or more features extracted from the time series measurement data, a target class corresponding to an event to be identified, and a time lag indicating a difference in time between a given extraction and the event to be identified; evaluating a plurality of classifiers during an evaluation phase using at least a portion of the input dataset and one or more predefined evaluation metrics that are weighted using a time-based relevance decay function based on the time lag; and selecting one or more of the plurality of classifiers to perform classification of the time series measurement data based on the one or more predefined weighted evaluation metrics during a classification phase.

In at least one embodiment, the time lags indicate a time difference between classification moments of the plurality of classifiers and a respective instance of the event to be identified. In one or more exemplary embodiments, the one or more predefined evaluation metrics comprise one or more of accuracy, precision, recall, F1 score, true positive rate and true negative rate that are weighted using the time-based relevance decay function based on the time lag. In addition, the time-based relevance decay function comprises, for example, one or more of a linear decay function, an exponential decay function and a step function.

Advantageously, illustrative embodiments of the invention provide improved techniques for comparing multiple classification results. These and other features and advantages of the present invention will become more readily apparent from the accompanying drawings and the following detailed description.

BRIEF DESCRIPTION OF THE DRAWINGS

FIG. 6 illustrates a graphical comparison of preventive maintenance, condition-based maintenance and corrective maintenance, regarding their associated total costs in accordance with an embodiment of the invention;

DETAILED DESCRIPTION

Figure 1:
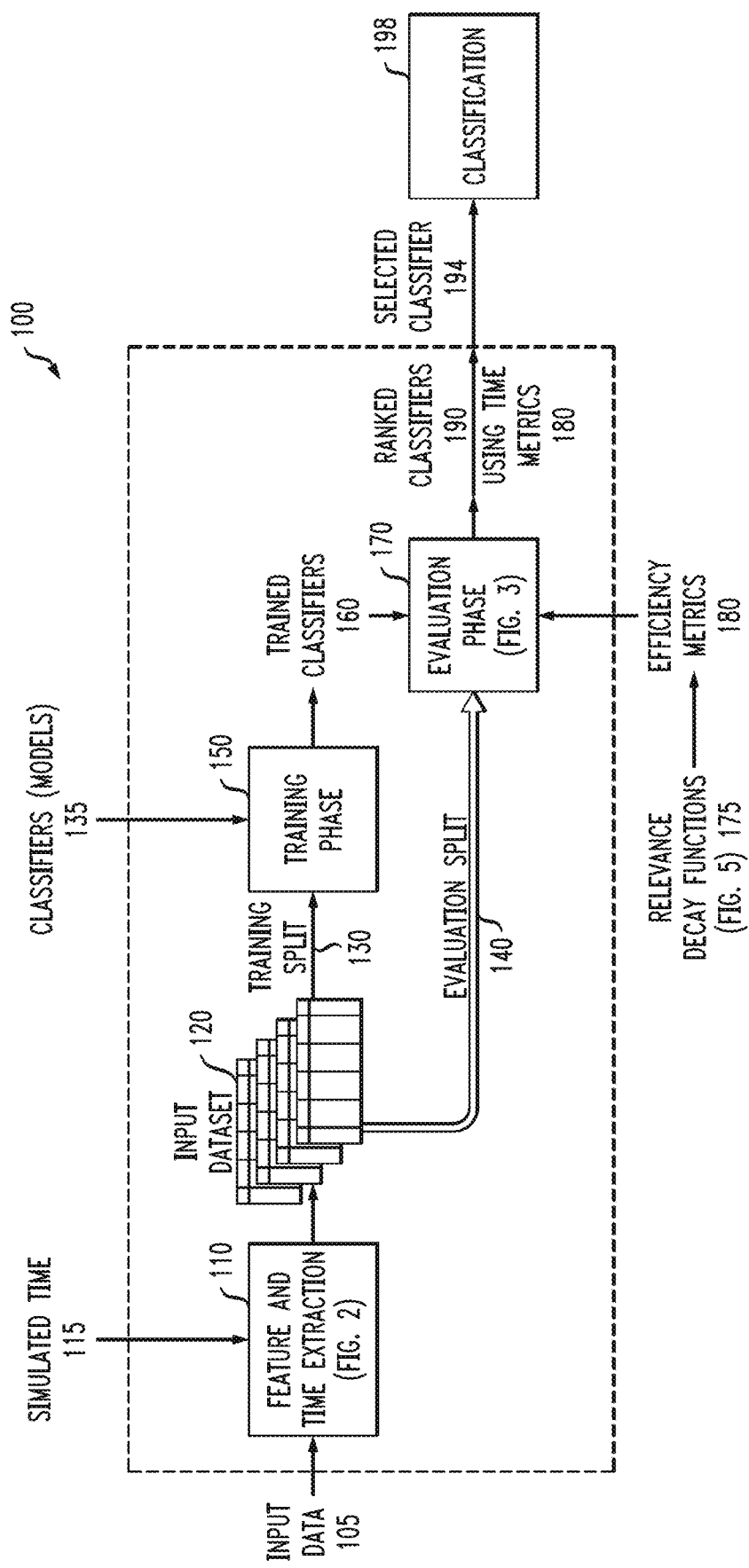
FIG. 1 illustrates a time-aware classifier selector according to one embodiment of the invention.

Illustrative embodiments of the present invention will be described herein with reference to exemplary communication, storage, and processing devices. It is to be appreciated, however, that the invention is not restricted to use with the particular illustrative configurations shown. One or more embodiments of the present invention provide relevance decay techniques for time-based evaluation of machine learning applications and other classifiers.

One or more embodiments of the invention provide methods and apparatus for relevance decay for Machine Learning processes, extending traditional metrics with time-based relevance information. In at least one embodiment, the disclosed techniques leverage a time-based multi-classifier evaluation that also depends on a windowed gain that a given classifier has over other classifiers.

With the emergence of real-time applications involving IoT and time-sensitive applications, industries that deal with real-time data urge for new ways to assess ML effectiveness from the time-sensitivity standpoint. One possible way for online testing is via well-known A/B tests, frequently seen as suitable for user-facing applications where the impact of failure is minimal. In the context of industrial applications, however, a failure to predict an event may result in greater damage. In these time-sensitive applications, where reaction is often of paramount importance (e.g., relevance of event identification decays over time), the traditional ML approach for training and evaluating in an offline manner fails to deliver the highest value to the business. In the case of Predictive Maintenance, for example, the system is supposed to identify whether equipment is subject to failure or behaving normally. See, for example, I.H.F. Santos, et al. "Big Data Analytics for Predictive Maintenance Modeling: Challenges and Opportunities," Offshore Technology Conference (OTC), Paper 26275 (Rio de Janeiro, Brazil, 2015). In this case, an approach that identifies a possible failure 10 hours before the real event is inherently better than a second approach that predicts the possible failure just 10 minutes in advance. Within that bigger prediction window, a maintenance crew could be prompted to remedy the predicted failures, spare parts could be bought and sent to the work site where the equipment is present, and/or equipment in a stand-by mode could be started preventively to replace the equipment that is likely to fail, mitigating the potential damage. While these potential remedies may be domain-specific, predicting at the earliest time (thus, with the highest relevance) can easily generate benefits in many other contexts, making this a broadly beneficial method.

Traditional evaluation metrics do not comprise a temporal comparison of classifiers. Such classifiers, when deployed in production environments, start to show different effectiveness from the effectiveness exhibited during the training/ evaluation phase. The lack of a mathematical metric for time-based efficiency metrics hinders the evaluation of classifiers in real-time (or simulated real-time) applications.

Depending on the context of a given application, two classifiers that identify the same behavior by a difference of 10 minutes can be considered different. For another application, the same 10 minute difference may be irrelevant. This context-dependency makes it hard to fully cover every possible aspect of the time-based relevance evaluation. Therefore, there is a need for a context-aware definition of classification relevance.

For many ML applications, traditional evaluation metrics, such as accuracy, precision recall, F1 score, true positive rate (TPR) or true negative rate (TNR), among others, are used to measure the quality of a classifier. When the need for time-related classification arises, these traditional metrics become largely obsolete, taking into account only the hit-or-miss characteristics and ignoring the temporal aspect.

With the growth of processing power, ML classification workflows go from training to validating a model in easily practical time. With this ability, multiple classifiers can be studied before selecting the best one. The problem arises when comparing multiple approaches, a task still limited by the traditional and static evaluation metrics. Since traditional metrics do not consider time-based relevance information, it remains unclear how traditional evaluation techniques can determine that a particular approach is better than other approaches because the particular approach identifies a particular behavior or event sooner than the other approaches. This lack of mathematical translation for the concept of "the sooner the better" hinders evaluation of multiple classifiers for time-sensitive applications.

One or more embodiments of the invention extend traditional ML evaluation metrics with time-aware efficiency metrics that comprise time-dependent relevance, allowing for a time-sensitive classifier comparison. As discussed further below, in addition to traditional feature extraction from time series data, the disclosed framework adds a temporal aspect to the extraction process. In particular, when a traditional data record is extracted, the distance in time of the extraction to the event to be identified is also extracted (referred to herein as the lag).

In at least one embodiment, multi-classifier comparison is performed using one or more time-aware efficiency metrics. The disclosed multi-classifier comparison techniques target, for example, a new breed of applications that must deal with real-time or time-sensitive data, arising, for example, from the world of Big Data and IoT. The traditional ML approaches work nicely for offline or batch-based applications, but when facing time-based scenarios, they tend to show lower effectiveness if compared to the offline evaluation phase.

The goal of ML-based event identification is to identify patterns in a behavior, enabling its prediction. In a typical setting, in order to learn the characteristics of a target behavior, a domain specialist or an automated process programmed to perform the feature extraction and class annotation (e.g., assigning a target class) selects parts of the temporal data (i.e., time series), to which a target class is assigned corresponding to the event to be identified. The training procedure involves identifying the time series characteristics (e.g., features) that lead to that target behavior or to its absence (typically called positive and negative classes).

FIG. 1 illustrates a time-aware classifier selector 100 according to one embodiment of the invention. Generally, FIG. 1 illustrates the exemplary time-aware classifier selector 100 in an extended ML workflow selecting a suitable classification model using time-aware efficiency metrics. As shown in FIG. 1, the exemplary time-aware classifier selector 100 ingests input data 105 and passes it through a feature and time extraction module 110, as discussed further below in conjunction with FIG. 2, which generates an input dataset 120, which differs from a traditional input dataset by having the lag component alongside the extracted features. This lag information comes from a simulated time 115 that injects, at each desired timestamp, the remaining window until the event under study. The resulting exemplary input dataset 120 comprises a plurality of records, each comprising features extracted from the input data 105 (e.g., time series measurement data), a target class corresponding to an event to be identified, and a time lag indicating a difference in time between a given extraction and the event to be identified.

A portion of the input dataset 120 is used as a training split 130 during a training phase 150, to train a plurality of classifiers (e.g., models) 135, in a known manner. Another portion of the input dataset 120 is used as an evaluation split 140 during an extended evaluation phase 170, which takes into account the lag information as discussed further below in conjunction with FIG. 3.

According to one aspect of the invention, the trained classifiers 160 are evaluated during the extended evaluation phase 170, using the data in the evaluation split 140 and one or more predefined efficiency metrics 180 that are weighted using one or more time-based relevance decay functions 175 (discussed further below in conjunction with FIG. 5) applied over the time lags in the data of the evaluation split 140.

As shown in FIG. 1, a ranked list 190 of the trained classifiers 160 is generated using the weighted efficiency metrics 180, for example, by sorting the trained classifiers 160 according the corresponding weighted efficiency metric 180. One or more of the ranked classifiers 190 are selected as a selected classifier 194 to perform classification 198 of the time series measurement data during the classification routine in a production environment, in a known manner.

With conventional techniques, the effectiveness of a trained classifier/predictor is evaluated using the same static characteristic of the training phase, without taking into consideration the time-sensitiveness in the prediction/classification. Traditional evaluation metrics are composed of hit-or-miss information, when the algorithm guesses the classes correctly or incorrectly given each static data record.

See, for example, Alice Zheng, "Evaluating Machine Learning Models," oreilly.com (2015).

The exemplary time-aware classifier selector 100 of FIG. 1 extends conventional ML-based event identification techniques in the feature extraction phase 110, by also extracting time information; and in the evaluation phase 170, by employing one or more predefined efficiency metrics 180 that are weighted using the one or more time-based relevance decay functions 175 (based on the extracted time lags).

Figure 2:
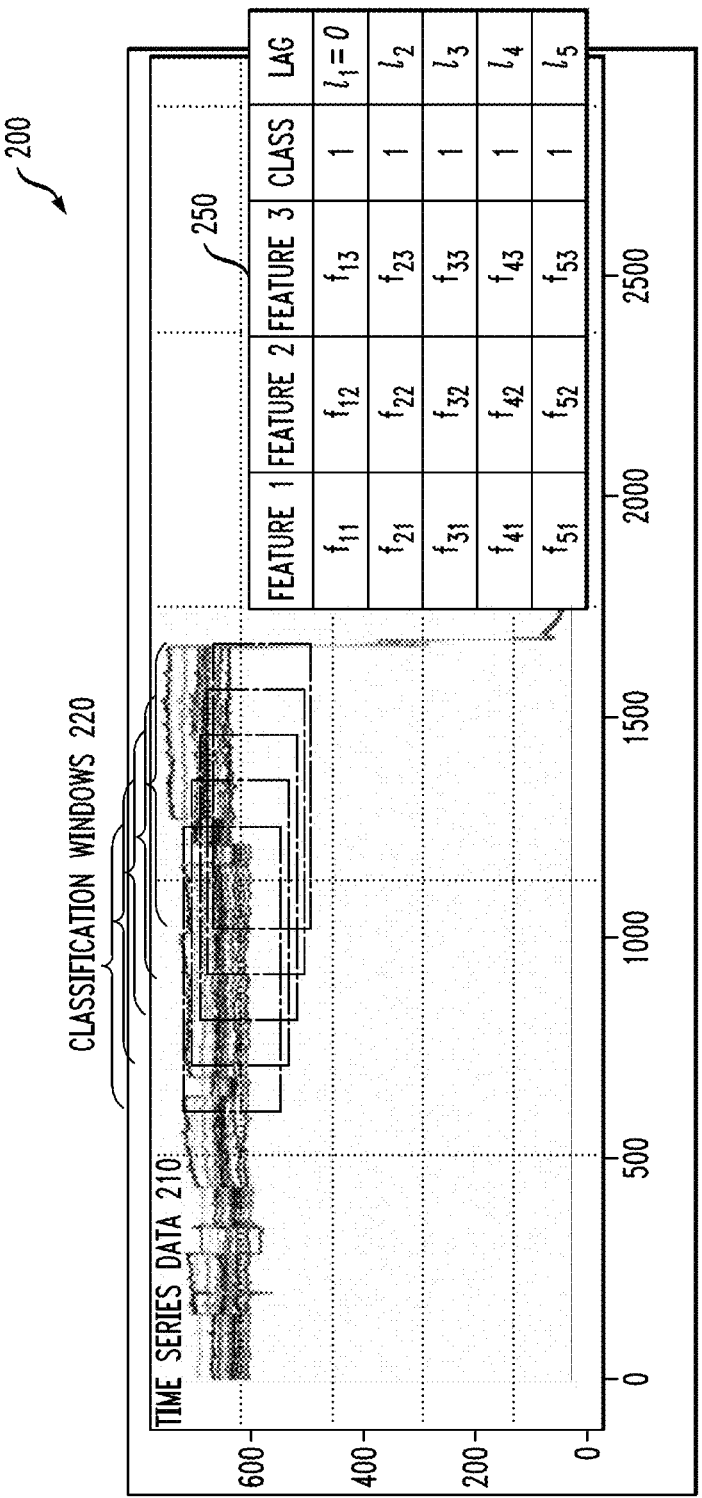
FIG. 2 illustrates a feature extraction phase that extracts time lag information associated with other extracted features according to one embodiment of the invention.

FIG. 2 illustrates a feature extraction phase 200 that is extended to also extract the time lag information associated with other extracted features. Generally, the feature extraction phase 200 translates time series data 210 into a static data record 250 for training a classifier 135. In the example of FIG. 2, three exemplary extracted features, feature 1 through feature 3, are extracted from the time series data 210, where each row in the data record 250 corresponds to a different classification window 220. The extracted features for each different classification window 220 are also assigned a class, for example, by a domain specialist or an automated process programmed to perform the feature extraction and class annotation (e.g., assigning a target class).

As noted above, an extended feature extraction phase 200 in accordance with an embodiment of the present invention also adds a temporal aspect to the extraction process. Now, in addition to extraction of the traditional data record (e.g., features 1 through 3), the distance in time to the event to be identified (e.g., the lag) is also extracted, as shown in FIG. 2. For the training phase 150, this temporal information may be irrelevant, but the time lag is processed during the extended evaluation phase 170. In particular, the extracted time lag provides a mechanism to measure the efficiency of each classifier according to the disclosed efficiency metrics 180, discussed further below.

In the notation of FIG. 2, i indicates the record row (i.e., classification window i) and j indicates the column, for features $f_{ij}$ and time lags $l_i$.

Time-Aware Evaluation Phase Using Extended Efficiency Metrics

As noted above, after the extended feature extraction phase 110, the evaluation split 140 now brings not only the record row and the target class from the data records 250, but also the respective lag. Using this time information, for each input row, the disclosed time-aware evaluation phase 170 also calculates its impact considering the temporal aspect, e.g., the gain in time for predicting the class with wider lags. With this information, the time-aware evaluation phase 170 may select not only the best classifier but also the classifier that maximizes the gain from larger prediction windows, using the extended efficiency metrics 180.

Figure 3:
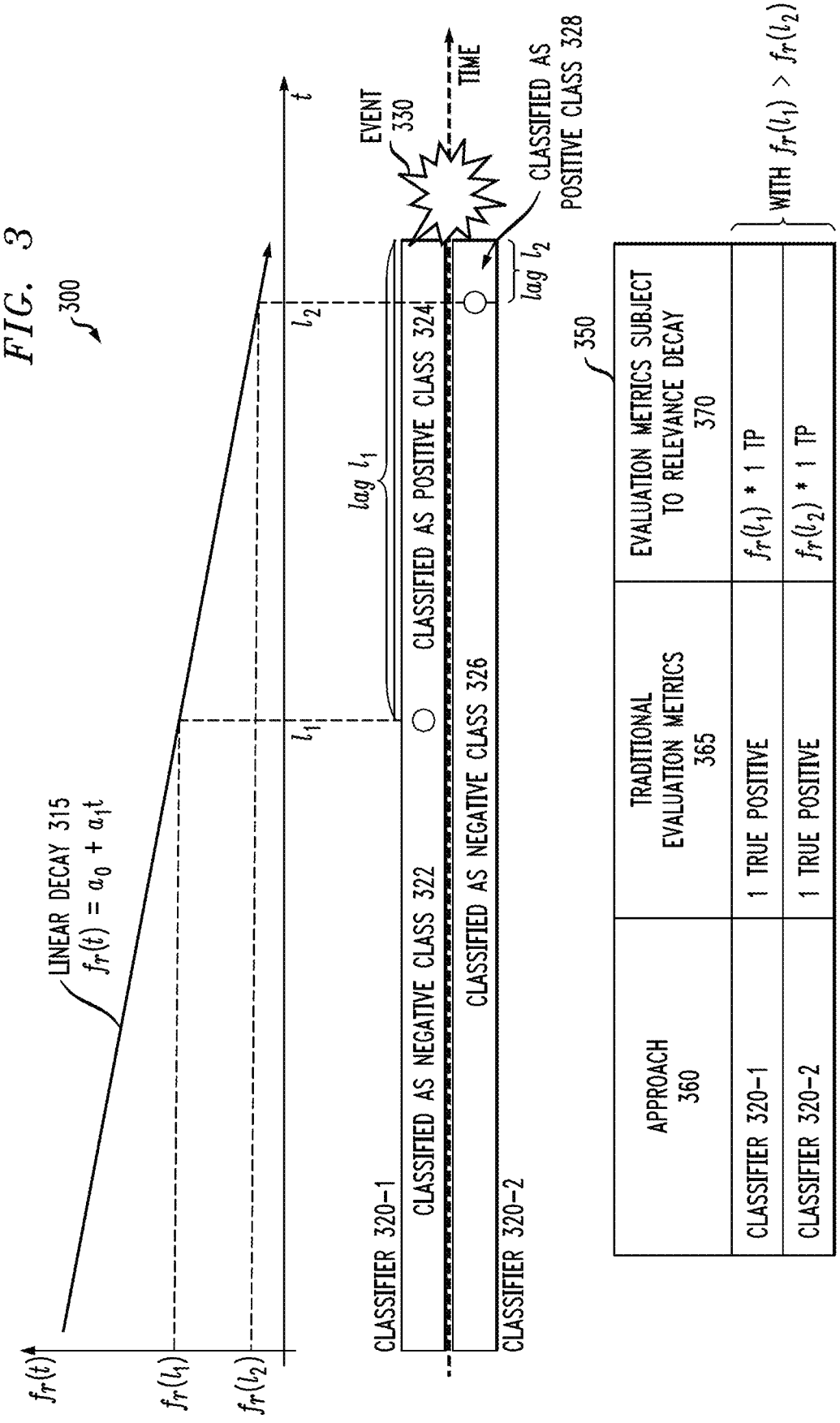
FIG. 3 illustrates an evaluation of a plurality of classifiers using an exemplary true positive rate efficiency metric weighted using a linear relevance decay function according to one embodiment of the invention.

FIG. 3 illustrates an evaluation 300 of a plurality of classifiers 320-1 and 320-2 using an exemplary true positive rate efficiency metric 180 weighted using a linear relevance decay function 315. As noted above, one or more aspects of the invention extend traditional efficiency metric 180, such as accuracy, precision recall, F1 score, TPR or TNR, using relevance decay functions 175. In this manner, the traditional efficiency metric 180 are weighted, given the lags of the related data records 250 and the relevance decay functions 175.

As shown in FIG. 3, exemplary classifier 320-1 classifies an event 330 with a time lag $l_1$, and exemplary classifier 320-2 classifies event 330 with a time lag $l_2$. With respect to event 330, prior to a time corresponding to time lag $l_1$, exemplary classifier 320-1 assigns a negative class 322, and after the time corresponding to time lag $l_1$, exemplary classifier 320-1 assigns a positive class 324. Likewise, prior to a time corresponding to time lag $l_2$, exemplary classifier 320-2 assigns a negative class 326, and after the time corresponding to time lag $l_2$, exemplary classifier 320-2 assigns a positive class 328.

As noted above, in the exemplary classifier evaluation 300 of FIG. 3, a linear relevance decay function 315 is employed. The linear relevance decay function 315 may be characterized by the following expression:

$$f_r(t) = a_0 + a_1 t.$$

As shown in the table 350, using traditional evaluation metrics, such as TPR, the two classifiers 320-1 and 320-2 would tie, as they both properly classified event 330, resulting in a true positive rate of 1.0. In one or more embodiments, the present invention applies the linear decay function 315 to refine the relevancy concept. By doing so, the disclosed exemplary classifier evaluation 300 detects that classifier 320-2 outperforms classifier 320-1, as:

$$f_r(l_1) * 1 \text{ TP} > f_r(l_2) * 1 \text{ TP}.$$

Thus, classifier 320-1 performs better than classifier 320-2 when time is taken into consideration. Because of the relation $f_r(l_1) > f_r(l_2)$, the extended evaluation framework weights both amounts of true-positives and identifies that classifier 320-1 is better (providing a mathematical translation for the concept of "the sooner the better").

In a further variation of the invention, step functions can be applied as decay functions. If TPR and TNR are used as examples of evaluation metrics, one may represent their traditional equations as below:

$$\text{True positive rate} = \frac{\sum TP}{\sum TP + \sum FN}; \text{ and}$$

$$\text{True negative rate} = \frac{\sum TN}{\sum TN + \sum FP}.$$

The extended versions of TPR and TNR have a decay-based term to weight the relevance of each measurement, as follows:

$$\text{Extended true positive rate} = \frac{\sum_i TP(i) * f_r(i)}{\sum TP + \sum FN}; \text{ and}$$

$$\text{Extended true negative rate} = \frac{\sum_i TN(i) * f_r(i)}{\sum TN + \sum FP}.$$

Assuming a step function as decay function $f_r(i)$, which can be defined as a constant 1 for timestamps before some threshold, which can be defined as the timestamp for the events under study, the TPR numerator is reverted to $\Sigma_i TP(i) * f_r(i) = \Sigma_i TP(i) * 1 = \Sigma_i TP(i)$. The TNR numerator is equally reverted back to the traditional representation when the step function is defined as 1 for timestamps before the event under study. This means that the disclosed definition of extended efficiency metrics may represent the current state of evaluation approaches by applying step functions as decay functions, while it still widens the horizon of efficiency evaluation for time-sensitive applications with more descriptive functions.

When evaluating multiple classifiers as in FIG. 3, traditional evaluation metrics fail to fully translate the time gain of one approach versus approach another in time-sensitive applications, because the temporal relevance of each classification is not encoded in those metrics. The example of FIG. 3 illustrates an evaluation 300 of two classifiers 320-1 and 320-2 using both the traditional (static) metrics and the time-based relevance metrics of the present invention.

Figure 4:
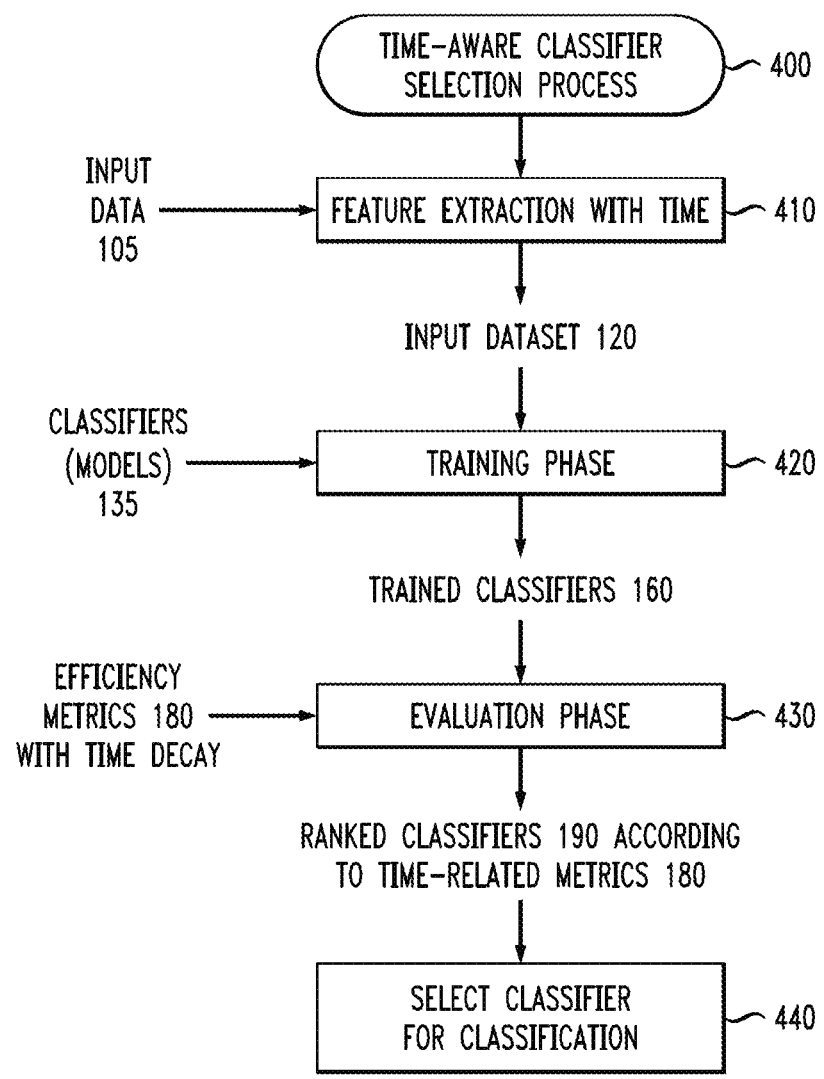
FIG. 4 is a flow chart illustrating an exemplary implementation of a time-aware classifier selection process according to one embodiment of the invention.

FIG. 4 is a flow chart illustrating an exemplary implementation of a time-aware classifier selection process 400 according to one embodiment of the invention. Generally, the time-aware classifier selection process 400 propagates the temporal aspect (lag) from the extended feature extraction phase 110 to the extended evaluation phase 170. During the extended evaluation phase 170, the exemplary time-aware classifier selection process 400 enriches the model comparison with the extended efficiency metrics 180, subject to relevance decay over time according to the relevance decay function(s) 175.

As shown in FIG. 4, the exemplary time-aware classifier selection process 400 performs feature extraction from the input data 105 with a time lag extraction as well, during step 410, to generate the input dataset 120. Thereafter, the exemplary time-aware classifier selection process 400 uses the input dataset 120 to train a number of different classifiers 135 during the training phase 420, generating trained classifiers 160.

The exemplary time-aware classifier selection process 400 then evaluates the trained classifiers 160, using extended efficiency metrics 180 with time decay, during the extended evaluation phase 430, to generate a set of ranked classifiers 190 that are ranked according to time-related metrics 180. Finally, the exemplary time-aware classifier selection process 400 selects a classifier for classification (e.g., real-time classification) during step 440.

In one or more embodiments, the invention comprises a parametric definition for the time-based relevance decay using a user-defined decay function. Such decay function is context-dependent, thus making the method context-aware.

Figure 5C:
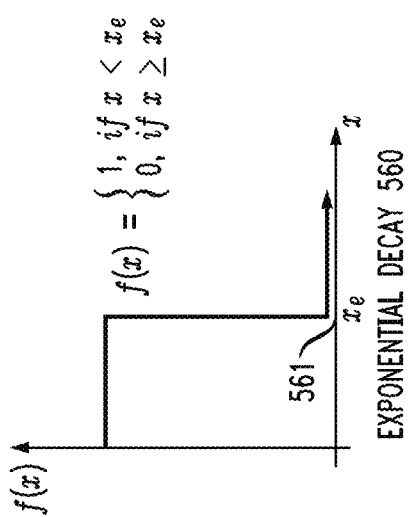
FIGS. 5A-5C illustrate exemplary linear, exponential and step functions, respectively, as examples of decay functions that may be used in accordance with the invention.
Figure 5B:
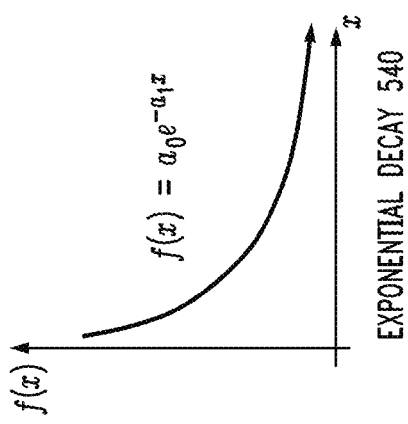
Figure 5A:
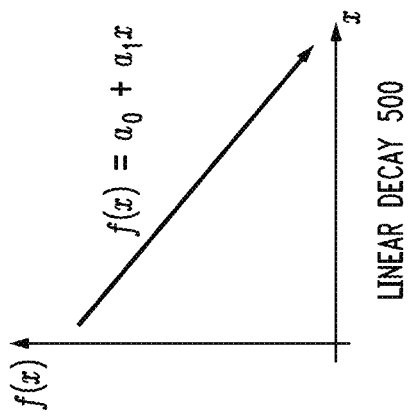

FIGS. 5A-5C illustrate exemplary linear, exponential and step functions 500, 540, 560, respectively, as examples of suitable decay functions. For some applications, such as Predictive Maintenance, the sooner the prediction is done, the better, so an example of decay function would be a monotonic decay function, such as a linear decay function 500. If necessary, an exponential decay function 540 may be used instead, quickly penalizing late classifiers. Finally, a step function 560 can be used to discard predictions after a given threshold, $x_e$ 561. To represent traditional evaluation metrics, for example, to accommodate legacy systems in the time-aware classifier selector 100 of FIG. 1, a step function 560 may be chosen and parameterized with $x_e$ 561 being defined as the timestamps of one or more events, as discussed above, thereby discarding irrelevant classifications made after the real event.

Using one or more decay functions 500, 540, 560, the traditional efficiency metrics, such as accuracy, recall, TPR or TNR, can be redefined as time-dependent metrics, where not only the traditional hit-or-miss characteristics improve the score but also the distance to the actual event as well (lag). This extension allows for a new evaluation method of the involved applications that takes the temporal aspect into consideration.

Examples

Multi-Classifier Evaluation on Predictive Asset Maintenance of Rotating Machines Detecting failures in rotating machines demands a process of collecting and storing relevant information (data) from the monitored physical assets for the purpose of condition-based maintenance. According to the information brought by this data, ML algorithms can be trained in order to identify the health status of the studied asset.

The Predictive Asset Maintenance (PAM) approach aims to optimize corrective maintenance and preventive maintenance, acting when needed according to ML supervisors. FIG. 6 illustrates a graphical comparison 600 of preventive maintenance 610, condition-based maintenance 620 and corrective maintenance 630, regarding their associated total costs 660 comprising repairing costs 670 and prevention costs 680. As shown in FIG. 6, the maintenance costs are plotted as a function of the number of failures.

Real-time applications demand information extraction and ML evaluation over live data, coming from the machines, in order to work properly and prevent bigger failures. However, the training phase can still be done statically without using the ideas proposed in this invention, which will result in the problems described above: the effectiveness degradation of ML approaches when facing live data.

On the other hand, if the disclosed extended efficiency metrics are applied to lag-enriched time series slices, in accordance with the present invention, the comparison of multiple classifiers can be leveraged in a controlled and simulated real-time world. The reasons why this is especially important for PAM applications are twofold. First, without live data coming in (even if simulated), one would never be able to identify the efficiency of individual classifiers and thus, would never be able to compare different approaches. Second, in industrial applications, simulated and free-of-impact environments are crucial for testing and evaluating approaches because it would be reckless to subject critical equipment to stress in order to evaluate different ML classifiers.

In this direction, one embodiment of this invention is the application of relevance decay for the multi-classifier comparison of ignition failures on rotating machines in oil rigs. It comprises the definition of linear decay functions which will impact the quality of the classification over time.

Using 24-hour windows for feature extraction, minute-by-minute periods were extracted and sequential frames concatenating 1440 timestamps (60 minutes in an hour X 24 hours) were built, sliding them on time in order to create the lagged window set. With those intervals, three distinct classifiers were trained (in an offline manner): (1) Random Forests (See, e.g., Leo Breiman, "Random Forests," Machine Learning, 45.1, 5-32 (2001)), (2) Decision Trees (See, e.g., J. Ross Quinlan, "Induction of Decision Trees," Machine Learning, 1.1, 81-106 (1986); and/or Chris Seiffert, et al., "RUSBoost: A Hybrid Approach to Alleviating Class Imbalance," IEEE Transactions on Systems, Man, and Cybernetics-Part A: Systems and Humans, 40.1, 185-197 (2010)).

The evaluation phase took into consideration the TPR as before, as well as the linearly-weighted sum of the TPR according to the prevention power brought by each one of the approaches, represented by the lag in prediction windows. In the end, the RUSBoost approach was elected as winner because it could leverage wider prediction horizons while still maintaining a good compromise between TPR and TNR, probably because of the random under-sampling (RUS) characteristic of the method. PAM is intrinsically an unbalanced problem, where there are much more normal behaviors (negative classes) than sick ones (positive classes). For such unbalanced problems, algorithms that deal with class imbalance usually perform better.

Multi-Classifier Evaluation on Stock Market Trends

Detecting trends in stock market trade is paramount to traders. Predicting trends correctly can lead to asset growth, surpassing the market average profitability. Controversially, predicting a trend that will not exist, or worse, predicting a growth trend when stock values are shrinking can lead to money loss.

Aside from detecting the trends correctly, one main factor that leads to great performance is the ability to predict trends before others do. The stock market works making lists of people willing to buy and sell the same paper and rank them by the prices they are willing to pay or receive. On the buyer's side, the highest bids are ranked first, whereas the lowest charges are ranked first on the seller's side.

The relevance of predicting a trend with a bigger time-window is the fact that these operations requests (bids or charges), in the event of a tie, are ranked higher using the timestamp they were placed, meaning that tied operation requests are ranked according to whoever placed the request first and, thus, this requester will be able to buy or sell earlier than the others tied with him. This is why some rooms close to the stock market servers are more expensive, which proves that time is a critical factor in stock trading.

In this embodiment, training and validation could be performed offline using previous time series information. If data is available, one can use an arbitrarily higher number of features to incorporate elements of fundamental and technical analysis (common approaches on stock market trending forecasting) on their classifiers or regressors.

Figure 7:
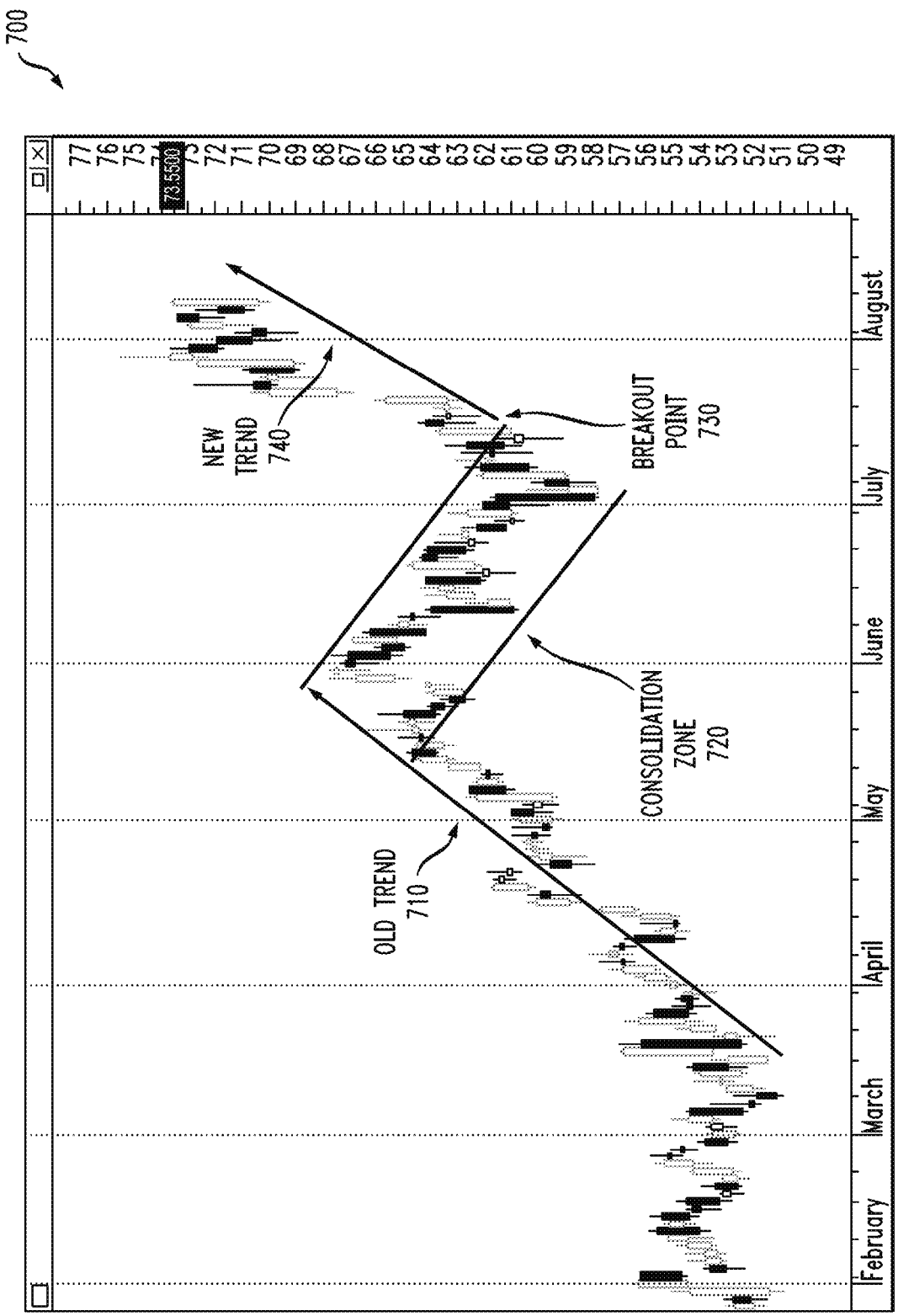
FIG. 7 illustrates a technical analysis of an exemplary stock series in accordance with an embodiment of the invention.

FIG. 7 illustrates a technical analysis 700 for an exemplary six month period of an exemplary stock series. It is noted that the technical analysis 700 could be performed for other time periods, such as shorter periods (intra-day, for example). As shown in FIG. 7, the exemplary stock series exhibits an old (prior) trend 710, a consolidation zone 720, a breakout point 730 and a new trend 740.

Using the disclosed method, one can incorporate time-decayed functions on their trend detectors to increase their performance. Since all requests have a finite number of stocks on sale or bid, being able to buy or sell first means that the trader will get greater prices for their requests (higher selling values and lower buying values), which, finally, leads to bigger profits. One or more aspects of the invention recognize that time-decayed functions 175 capture the criticality of time by penalizing forecasts made moments later. Using an adequate time-box and decay parameter, it is possible to quantify money loss because of forecasting delays. These parameters (decay function and prediction windows or horizons) could also be calibrated on evaluation phase.

Conclusion

One or more embodiments of the invention provide methods and apparatus for relevance decay for Machine Learning (ML) processes, extending traditional metrics with time-based relevance information. In at least one embodiment, the disclosed techniques leverage a time-based multi-classifier evaluation that also depends on a windowed gain that a given classifier has over other classifiers.

The foregoing applications and associated embodiments should be considered as illustrative only, and numerous other embodiments can be configured using the relevance decay techniques for time-based evaluation of machine learning applications and other classifiers disclosed herein, in a wide variety of different applications.

It should also be understood that the techniques for comparing multiple classification results, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for comparing multiple classification results may be implemented using one or more processing platforms. One or more of the processing modules or other components may therefore each run on a computer, storage device or other processing platform element. A given such element may be viewed as an example of what is more generally referred to herein as a "processing device."

Figure 8:
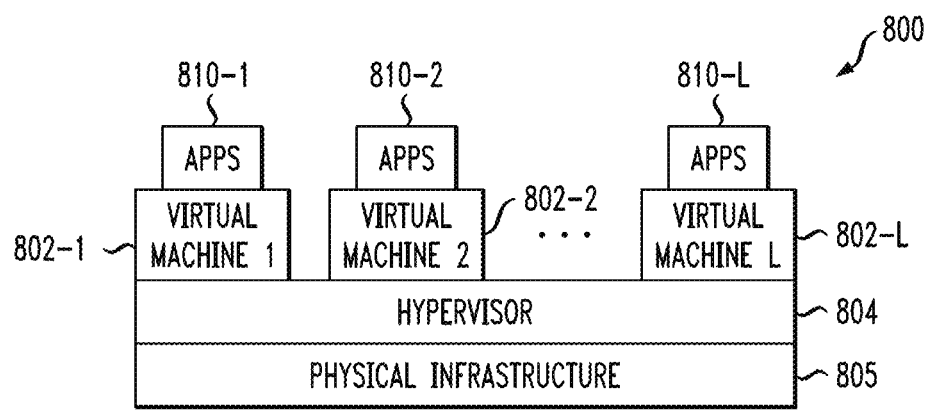
FIG. 8 illustrates an exemplary processing platform that may be used to implement at least a portion of one or more embodiments of the invention comprising a cloud infrastructure.

Referring now to FIG. 8, one possible processing platform that may be used to implement at least a portion of one or more embodiments of the invention comprises cloud infrastructure 800. The cloud infrastructure 800 in this exemplary processing platform comprises virtual machines (VMs) 802-1, 802-2, . . . 802-L implemented using a hypervisor 804. The hypervisor 804 runs on physical infrastructure 805. The cloud infrastructure 800 further comprises sets of applications 810-1, 810-2, . . . 810-L running on respective ones of the virtual machines 802-1, 802-2, . . . 802-L under the control of the hypervisor 804.

The cloud infrastructure 800 may encompass the entire given system or only portions of that given system, such as one or more of client, servers, controllers, or computing devices in the system.

Although only a single hypervisor 804 is shown in the embodiment of FIG. 8, the system may of course include multiple hypervisors each providing a set of virtual machines using at least one underlying physical machine.

An example of a commercially available hypervisor platform that may be used to implement hypervisor 804 and possibly other portions of the system in one or more embodiments of the invention is the VMware® vSphere™ which may have an associated virtual infrastructure management system, such as the VMware® vCenter™. The underlying physical machines may comprise one or more distributed processing platforms that include storage products, such as VNX™ and Symmetrix VMAX™, both commercially available from EMC Corporation of Hopkinton, Mass. A variety of other storage products may be utilized to implement at least a portion of the system.

In some embodiments, the cloud infrastructure additionally or alternatively comprises a plurality of containers implemented using container host devices. For example, a given container of cloud infrastructure illustratively comprises a Docker container or other type of LXC. The containers may be associated with respective tenants of a multi-tenant environment of the system, although in other embodiments a given tenant can have multiple containers. The containers may be utilized to implement a variety of different types of functionality within the system. For example, containers can be used to implement respective compute nodes or cloud storage nodes of a cloud computing and storage system. The compute nodes or storage nodes may be associated with respective cloud tenants of a multi-tenant environment of system. Containers may be used in combination with other virtualization infrastructure such as virtual machines implemented using a hypervisor.

Figure 9:
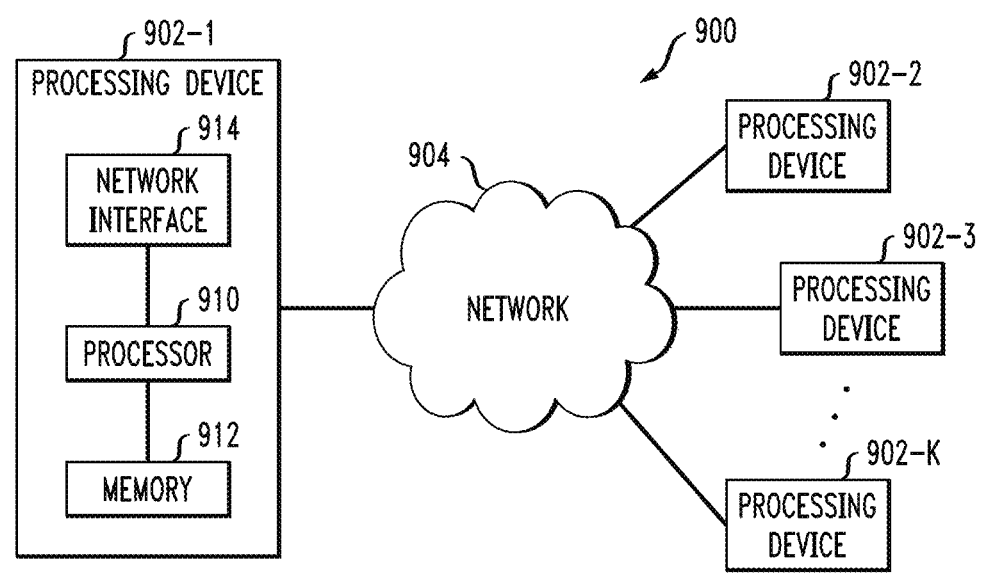
FIG. 9 illustrates another exemplary processing platform that may be used to implement at least a portion of one or more embodiments of the invention.

Another example of a processing platform is processing platform 900 shown in FIG. 9. The processing platform 900 in this embodiment comprises at least a portion of the given system and includes a plurality of processing devices, denoted 902-1, 902-2, 902-3, . . . 902-K, which communicate with one another over a network 904. The network 904 may comprise any type of network, such as a wireless area network (WAN), a local area network (LAN), a satellite network, a telephone or cable network, a cellular network, a wireless network such as WiFi or WiMAX, or various portions or combinations of these and other types of networks.

The processing device 902-1 in the processing platform 900 comprises a processor 910 coupled to a memory 912. The processor 910 may comprise a microprocessor, a microcontroller, an application specific integrated circuit (ASIC), a field programmable gate array (FPGA) or other type of processing circuitry, as well as portions or combinations of such circuitry elements, and the memory 912, which may be viewed as an example of a "computer program product" having executable computer program code embodied therein, may comprise random access memory (RAM), read only memory (ROM) or other types of memory, in any combination.

Also included in the processing device 902-1 is network interface circuitry 914, which is used to interface the processing device with the network 904 and other system components, and may comprise conventional transceivers.

The other processing devices 902 of the processing platform 900 are assumed to be configured in a manner similar to that shown for processing device 902-1 in the figure.

Again, the particular processing platform 900 shown in the figure is presented by way of example only, and the given system may include additional or alternative processing platforms, as well as numerous distinct processing platforms in any combination, with each such platform comprising one or more computers, storage devices or other processing devices.

Multiple elements of system may be collectively implemented on a common processing platform of the type shown in FIG. 8 or 9, or each such element may be implemented on a separate processing platform.

As is known in the art, the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a tangible recordable medium (e.g., floppy disks, hard drives, compact disks, memory cards, semiconductor devices, chips, application specific integrated circuits (ASICs)) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk.

Also, it should again be emphasized that the above-described embodiments of the invention are presented for purposes of illustration only. Many variations and other alternative embodiments may be used. For example, the disclosed techniques for comparing multiple classification results are applicable to a wide variety of other types of communication systems, storage systems and processing devices. Accordingly, the particular illustrative configurations of system and device elements detailed herein can be varied in other embodiments. These and numerous other alternative embodiments within the scope of the appended claims will be readily apparent to those skilled in the art.

What is claimed is:

1. A method, comprising the steps of:
obtaining time series measurement data;
generating an input dataset comprising a plurality of records, wherein each record comprises one or more features extracted from said time series measurement data, a target class corresponding to an event to be identified, and a time lag indicating a difference in time between a given extraction and said event to be identified;
evaluating a plurality of classifiers during an evaluation phase using at least a portion of said input dataset and one or more predefined evaluation metrics that are weighted for each of the plurality of classifiers using a time-based relevance decay function based on a corresponding time lag indicating a difference between an actual time when a given event occurred and a time when each of the respective classifiers of the plurality of classifiers predicted the given event, wherein the plurality of classifiers perform classification of said at least said portion of said input dataset to assign a class to said at least said portion of said input dataset for comparison to said target class during said evaluation phase; and
selecting one or more of said plurality of classifiers to perform classification of said time series measurement data based on said one or more predefined weighted evaluation metrics during a classification phase.

2. The method of claim 1, further comprising the step of training said plurality of classifiers using at least a portion of said input dataset.

3. The method of claim 1, wherein said one or more predefined evaluation metrics comprise one or more of accuracy, precision, recall, F1 score, true positive rate and true negative rate that are weighted using said time-based relevance decay function based on said time lag.

4. The method of claim 3, wherein said time-based relevance decay function comprises one or more of a linear decay function, an exponential decay function and a step function.

5. The method of claim 1, wherein said time series measurement data comprises one or more of telemetry data and log data.

6. The method of claim 1, wherein said step of generating said input dataset comprises selecting a portion of said time series measurement data, extracting said one or more features from said selected portion of said time series measurement data, and assigning said target class corresponding to said event to be identified.

7. The method of claim 1, wherein said time lags indicate a time difference between classification moments of the plurality of classifiers and a respective instance of the event to be identified.

8. The method of claim 1, wherein said event to be identified comprises one or more of an event to be classified and an event to be predicted using a machine learning application.

9. A computer program product for annotating time series measurement data, comprising a non-transitory machine-readable storage medium having encoded therein executable code of one or more software programs, wherein the one or more software programs when executed perform the following steps:

obtaining time series measurement data;

generating an input dataset comprising a plurality of records, wherein each record comprises one or more features extracted from said time series measurement data, a target class corresponding to an event to be identified, and a time lag indicating a difference in time between a given extraction and said event to be identified;

evaluating a plurality of classifiers during an evaluation phase using at least a portion of said input dataset and one or more predefined evaluation metrics that are weighted for each of the plurality of classifiers using a time-based relevance decay function based on a corresponding time lag indicating a difference between an actual time when a given event occurred and a time when each of the respective classifiers of the plurality of classifiers predicted the given event, wherein the plurality of classifiers perform classification of said at least said portion of said input dataset to assign a class to said at least said portion of said input dataset for comparison to said target class during said evaluation phase; and selecting one or more of said plurality of classifiers to perform classification of said time series measurement data based on said one or more predefined weighted evaluation metrics during a classification phase.

10. The computer program product of claim 9, wherein said one or more predefined evaluation metrics comprise one or more of accuracy, precision, recall, F1 score, true positive rate and true negative rate that are weighted using said time-based relevance decay function based on said time lag.

11. The computer program product of claim 10, wherein said time-based relevance decay function comprises one or more of a linear decay function, an exponential decay function and a step function.

12. The computer program product of claim 9, wherein said step of generating said input dataset comprises selecting a portion of said time series measurement data, extracting said one or more features from said selected portion of said time series measurement data, and assigning said target class corresponding to said event to be identified.

13. The computer program product of claim 9, wherein said time lags indicate a time difference between classification moments of the plurality of classifiers and a respective instance of the event to be identified.

14. The computer program product of claim 9, wherein said event to be identified comprises one or more of an event to be classified and an event to be predicted using a machine learning application.

15. A system for annotating time series measurement data, comprising:

a memory; and at least one hardware device, coupled to the memory, operative to implement the following steps:

obtaining time series measurement data;

generating an input dataset comprising a plurality of records, wherein each record comprises one or more features extracted from said time series measurement data, a target class corresponding to an event to be identified, and a time lag indicating a difference in time between a given extraction and said event to be identified;

evaluating a plurality of classifiers during an evaluation phase using at least a portion of said input dataset and one or more predefined evaluation metrics that are weighted for each of the plurality of classifiers using a time-based relevance decay function based on a corresponding time lag indicating a difference between an actual time when a given event occurred and a time when each of the respective classifiers of the plurality of classifiers predicted the given event, wherein the plurality of classifiers perform classification of said at least said portion of said input dataset to assign a class to said at least said portion of said input dataset for comparison to said target class during said evaluation phase; and selecting one or more of said plurality of classifiers to perform classification of said time series measurement data based on said one or more predefined weighted evaluation metrics during a classification phase.

16. The system of claim 15, wherein said one or more predefined evaluation metrics comprise one or more of accuracy, precision, recall, F1 score, true positive rate and true negative rate that are weighted using said time-based relevance decay function based on said time lag.

17. The system of claim 16, wherein said time-based relevance decay function comprises one or more of a linear decay function, an exponential decay function and a step function.

18. The system of claim 15, wherein said step of generating said input dataset comprises selecting a portion of said time series measurement data, extracting said one or more features from said selected portion of said time series measurement data, and assigning said target class corresponding to said event to be identified.

19. The system of claim 15, wherein said time lags indicate a time difference between classification moments of the plurality of classifiers and a respective instance of the event to be identified.

20. The system of claim 15, wherein said event to be identified comprises one or more of an event to be classified and an event to be predicted using a machine learning application.

* * * * *